United States Patent [19]

Makansi et al.

[11] Patent Number: 4,804,959

[45] Date of Patent: Feb. 14, 1989

[54] METHOD AND APPARATUS USING MULTIPLE CODES TO INCREASE STORAGE CAPACITY

[75] Inventors: Tarek Makansi, Pleasanton; Constantin M. Melas, Los Gatos; Arvind M. Patel; Steven H. Souther, both of San Jose, all of Calif.

[73] Assignee: International Business Machines Corporation, Armonk, N.Y.

[21] Appl. No.: 119,010

[22] Filed: Nov. 10, 1987

[51] Int. Cl.[4] .............................................. H03M 7/00
[52] U.S. Cl. ....................................... 341/59; 341/61; 341/67
[58] Field of Search ................... 340/347 DD; 360/39, 360/40, 48; 341/50, 59, 61, 67

[56] References Cited

U.S. PATENT DOCUMENTS 3,689,899 9/1972 Franaszek .................... 340/347 DD
4,714,967 12/1987 Bizjak ................................. 360/48

OTHER PUBLICATIONS

Young, M. S., "Constant-Density Recording Comes Alive with New Chips", Electronic Design, Nov. 1986, pp. 141-144.

Primary Examiner—William M. Shoop, Jr.
Assistant Examiner—Richard K. Blum
Attorney, Agent, or Firm—Simon K. Lee; Henry E. Otto, Jr.

[57] ABSTRACT

To increase storage capacity of a disk storage device, the recording surface of the device is partitioned into a plurality of concentric recording bands, data to be recorded on respective bands are encoded using different run-length-limited codes with the code rate of each band being higher than the adjacent inner band.

6 Claims, 1 Drawing Sheet

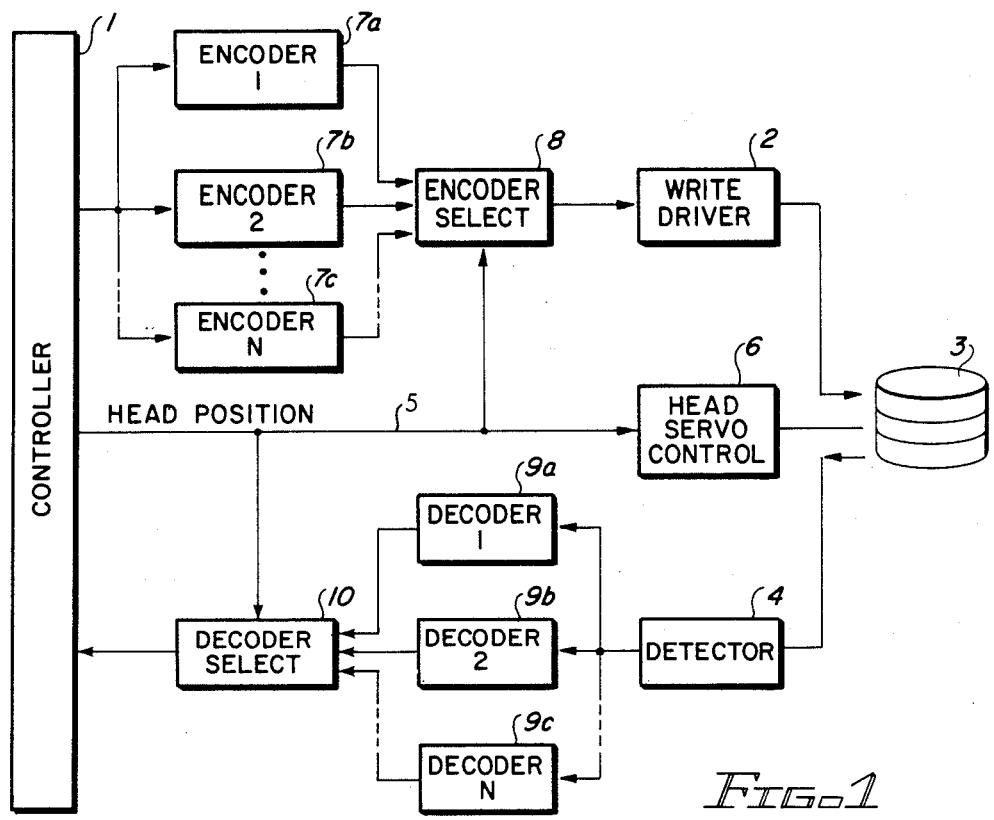
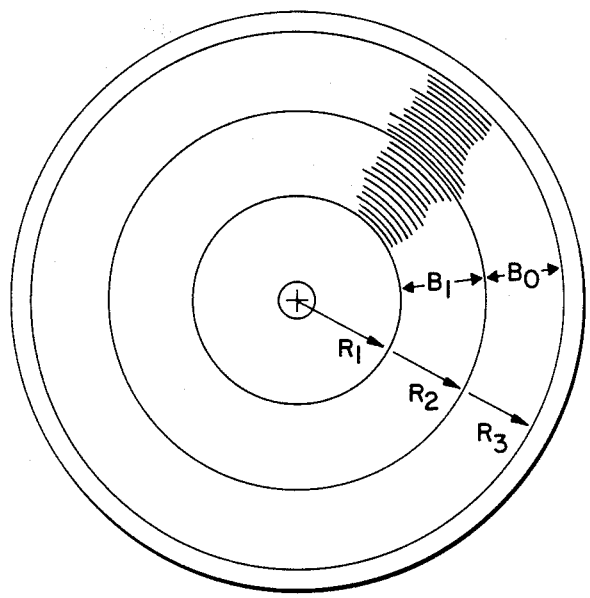

METHOD AND APPARATUS USING MULTIPLE CODES TO INCREASE STORAGE CAPACITY

TECHNICAL FIELD

This invention relates to disk storage devices. More particularly, it relates to method and apparatus for increasing data storage capacity of disk storage devices.

BACKGROUND OF THE INVENTION

In magnetic disk recording, it is well known that customer information data bits are recorded as transitions of magnetization along a disk track. If the data bit is a "1", then a magnetization transition is recorded (say, from north to south). If the next data bit is also a "1", another magnetization transition is again recorded (this time from south to north). On the other hand, if the data bit is a "0", then no transition is recorded. Crowding of transitions causes intersymbol interferences (ISI) and makes data recovery more difficult due to resolution limitation in the readback head. As the maximum data density of a storage device is limited by the amount of intersymbol interferences that can be tolerated by its read/write channel, the traditional approaches to increase storage capacity of disk storage devices have been directed to overcoming the ISI limitation. One of these approaches is partial response maximum likelihood (PRML) detection, which seek to improve the detection capability of recorded signals in the presence of noise.

Another way to alleviate crowding is to use a code that requires n "0's" between consecutive "1's" to thereby reduce transition crowding by a factor of n+1, and codes that have this property are called run-length-limited (RLL) codes. Examples of such codes are the (2,7) code, which requires two "0's" between consecutive "1's" and the (1,7) code which requires one "0" between consecutive "1's".

RLL codes alleviate transition crowding by introducing redundant "0's" to prevent the occurrence of consecutive "1's". Hence, the number of encoded bits is greater than the number of customer bits, the difference being the number of redundant bits. However, while RLL codes introduce redundant bits into a string of customer information bits, they increase the overall effective storage capacity of a recording device by allowing, as the result of such introduction, transitions to be recorded further apart. The rate of a code is defined as the ratio of the number of customer bits to the number of encoded bits. The (2,7) code has a rate of ½ and the (1,7) code has a rate of ⅔. Magnetic recording systems today use one code throughout the disk recording surface, and also record the same number of bits on each track. However, because the inner tracks are shorter, the transitions are more crowded on the inner tracks than on the outer tracks.

The industry is seeking to increase data capacity by making the density of transitions more uniform throughout the disk surface. "Constant density recording comes alive with new chips", Electronic Design, Nov. 13, 1986, p. 141, is evidence of the approach currently being taken. The article suggests using a higher clock frequency for outer tracks, hence increasing the number of transitions recorded there and the overall disk surface capacity. Because of the higher clock frequency used on outer tracks, more bits are recorded as the disk rotates one revolution.

Varying the frequency in this manner presents some engineering problems in designing the channel to handle a range of frequencies. Also, synchronous DASD architectures are less amenable to variable bit rates than nonsynchronous architectures. Other attempts include the suggestion of making outer tracks narrower than inner tracks; or varying the rotational speed of a disk faster as a function of increasing track radii, so that a constant rate of transition can be recorded throughout the disk surface. To those skilled in the art, however, it is readily clear that these approaches are inefficient because of the complicated mechanical design and implementation involved.

An object of this invention is to increase disk storage capacity by exploiting track length differences between outer tracks and inner tracks. It is another object of this invention that such increase be accomplished with only minimal impact on the design, such as using only a single clock frequency, and manufacturing of the disk device.

This invention accomplishes uniformity of transition density throughout a disk surface by keeping the same clock frequency, but changing the code used. Outer tracks use higher rate codes than inner tracks. That is, the code used on outer tracks requires fewer "0's" between "1's". The use of higher rate codes on the outer tracks tends to equalize the transition densities between the outer and inner tracks. And, because higher rate codes encode more customer bits per transition, the outer tracks contain more customer information than the inner tracks. The result is an increase in disk surface capacity and a more uniform transition density throughout the surface.

According to this invention, the method in which the above objects are satisfied comprises the steps of: partitioning recording tracks of the device into a plurality of recording bands, including a first band surrounded by an outer band; encoding data being recorded on said first band under a first run-length-limited code; and encoding data being recorded on said outer band under a second run-length-limited code having a higher code rate than said first run-length-limited code.

BRIEF DESCRIPTION OF THE DRAWINGS

FIG. 1 is a block diagram of the disk subsystem which embodies the present invention; and FIG. 2 illustrates a disk surface partitioned into recording bands according to this invention.

DESCRIPTION OF THE PREFERRED EMBODIMENT

FIG. 1 illustrates a general implementation of the present invention. In the block diagram of FIG. 1, there is shown a disk storage subsystem which comprises a disk controller 1 for receiving and executing disk read/write commands from a processing unit (not shown), write driver 2 for writing data into the disk stack 3, and detector 4 for reading stored data from the disk stack 3. Details concerning the operation of controller 1, the write driver 2 and the detector 4 are all well known in the art and therefore need not be described here.

Included in the disk storage subsystem is a plurality of RLL encoders $7a, 7b, \ldots, 7n$ along with their respective counterpart RLL decoders $9a, 9b, \ldots, 9n$. Each encoder has a different code rate, which is commonly understood as the ratio between the number of input data bits to the number of encoded bits produced there-from (for example, the code rate is 1:2 for the (2,7) code, 2:3 for the (1,7) code, and 8:9 for the (0,3) code).

By way of example, the operation of a disk storage subsystem having a (1,7) RLL encoder and a (2,7) RLL encoder is now described. An example of a (1,7) RLL encoder can be found in U.S. Pat. No. 3,689,899 and an example of a (2,7) RLL encoder can be found in U.S. Pat. No. 4,413,251).

As illustrated in FIG. 2, the recording surface of each disk is divided into an inner recording band $B_i$ extending from the track with radius $R_1$ to a track with radius $R_2$, and an outer recording band $B_o$ extending from the track with radius $R_2$ to the track with radius $R_3$. Data to be recorded on $B_i$ will be encoded under the (2,7) code while data to be recorded on $B_o$ will be encoded under the (1,7) code. Although the recording surface can be divided in many different ways, it is obvious that the division should be made to maximize the storage capacity of the surface given the set of RLL codes.

Included in each disk read/write command is a track address, from which the controller 1 generates a head position signal 5 for directing, via the head servo control 6, the recording/sensing head of the disk stack 3 to a radial position where the corresponding operation of the disk command is to be performed.

In performing a write operation, the data to be stored is received by both the (1,7) and the (2,7) encoders. However, only the output of one encoder is selected by encoder select 8 to be gated to write driver 2 for writing into the disk stack 3. This selection is made by comparing the corresponding head position 5 of the operation with the values $R_1$, $R_2$ and $R_3$. As a result, data stored in inner band $B_i$ will be encoded under the (2,7) RLL code while data stored in outer band $B_o$ will be encoded under the (1,7) RLL code, which has a higher code rate than the (2,7) code.

Similarly, in performing a read operation, the signal from the detector 4 is received by the (1,7) decoder and the (2,7) decoder. However, only the output of one of these decoders is selected by decoder select 10 to be gated to controller 1. The selection is also based upon comparison between the corresponding head position with $R_1$, $R_2$ and $R_3$.

It will be understood that if desired, the recording disk may be partitioned into more than two concentric recording bands, with each respective band having a higher run-length-limited code rate than any corresponding adjacent inner band. For example, the recording surface can be partitioned into an innermost first band wherein data is encoded under a (2,7) RLL code, a second band, on the outside of the first band, wherein data is encoded under a (1,7) RLL code, and an outermost is third wherein data is encoded under a (0,3) RLL code. Also, if desired, other RLL codes, or other combinations of RLL codes may be used.

While the invention has been particularly shown and described with reference to a preferred embodiment thereof, it will be understood by those skilled in the art that various changes in detail may be made therein without departing from the spirit, scope and teaching of the invention.

We claim:

1. A method for increasing the effective storage capacity of a disk storage device, comprising the steps of:
   (a) partitioning recording tracks of the device into a plurality of concentric recording bands, including a first band surrounded by an outer second band;
   (b) providing a first encoder for encoding data in one run-length-limited code for recording on said first band:
   (c) providing another encoder for encoding data for recording on said second band in another run-length-limited code having a higher code rate;
   (d) providing a write driver operative at one clock frequency; and
   (e) responsive to the track address designated in a disk write command, selectively connecting one of said encoders to the write driver for recording data at said one frequency on that band which includes said address;
   (f) using a detector operative at said one clock frequency and one decoder, decoding data recorded in said first band;
   (g) using said detector operative at said one clock frequency and another decoder, decoding data recorded in said second band; and
   (h) responsive to the track address in a disk read command, selectively connecting one of the decoders to the detector for reading data at said one frequency on that band which includes the last mentioned address.

2. A method according to claim 1 wherein one of said first and second run-length-limited codes is a (1,7) code.

3. A method according to claim 1 wherein one of said first and second run-length-limited codes is a (2,7) code.

4. A method according to claim 1 wherein said first run-length-limited code is a (2,7) code and said second run-length-limited code is a (1,7) code.

5. A method for increasing the effective storage capacity of a disk storage device, comprising the steps of:
   (a) partitioning recording tracks of the device into a plurality of concentric recording bands, including a first band surrounded by an outer second band;
   (b) using a detector operative at one clock frequency and one decoder, decoding data recorded on said first band in a first run-length-limited code;
   (c) using the same detector operative at said one frequency and another decoder, decoding data recorded on said second band in a second run-length-limited code having a higher code rate than said first run-length-limited code; and
   (d) responsive to the track address designated in a disk read command, selectively connecting one of said decoders to the detector for reading data at said frequency on that band which includes said address.

6. A method for increasing the effective storage capacity of a disk storage device, comprising the steps of:
   (a) partitioning recording tracks of the device into a plurality of concentric recording bands, including a first band surrounded by an outer second band;
   (b) providing a first encoder for encoding data in one run-length-limited code for recording on said first band:
   (c) providing another encoder for encoding data for recording on said second band in another run-length-limited code having a higher code rate;
   (d) providing a write driver operative at a selected frequency; and
   (e) responsive to the track address designated in a disk write command, selectively connecting one of said encoders to the write driver for recording data at said frequency on that band which includes said address.

* * * * *